United States Patent
Kang et al.

(10) Patent No.: US 8,025,096 B2
(45) Date of Patent: Sep. 27, 2011

(54) DOOR ACTUATING DEVICE FOR AIR CONDITIONER OF VEHICLE

(75) Inventors: Sung Ho Kang, Daedeok-gu (KR); Sang Chul Byon, Daedeok-gu (KR); Yong Eun Seo, Daedeok-gu (KR); Yong Sang Kim, Daedeok-gu (KR); Yun Cheol Park, Daedeok-gu (KR)

(73) Assignee: Halla Climate Control Corp., Daejeon (KR)

( * ) Notice: Subject to any disclaimer, the term of this patent is extended or adjusted under 35 U.S.C. 154(b) by 1227 days.

(21) Appl. No.: 11/703,273

(22) Filed: Feb. 7, 2007

(65) Prior Publication Data

US 2007/0204434 A1 Sep. 6, 2007

(30) Foreign Application Priority Data

Feb. 8, 2006 (KR) .................. 10-2006-0012017
Jan. 30, 2007 (KR) .................. 10-2007-0009482

(51) Int. Cl.
*B60H 1/00* (2006.01)

(52) U.S. Cl. .................. 165/202; 165/42; 62/244

(58) Field of Classification Search .................. 165/42, 165/43, 44, 202, 203, 204; 62/244, 262
See application file for complete search history.

(56) References Cited

U.S. PATENT DOCUMENTS

| 2,986,016 | A | * | 5/1961 | Gillham et al. | 62/262 |
| 3,921,416 | A | * | 11/1975 | Murnane et al. | 62/262 |
| 3,975,920 | A | * | 8/1976 | McCauley et al. | 62/262 |
| 4,090,373 | A | * | 5/1978 | Lang et al. | 62/262 |
| 4,164,852 | A | * | 8/1979 | Anzalone | 62/262 |
| 5,396,781 | A | * | 3/1995 | Mochizuki et al. | 62/262 |
| 6,032,723 | A | * | 3/2000 | Tsuihiji et al. | 165/42 |
| 6,179,044 | B1 | * | 1/2001 | Tabara | 165/42 |

FOREIGN PATENT DOCUMENTS

| JP | 1993-76818 A | 10/1993 |
| KR | 20-1998-0045709 | 9/1998 |

* cited by examiner

*Primary Examiner* — Ljiljana Ciric
(74) *Attorney, Agent, or Firm* — The Webb Law Firm

(57) ABSTRACT

A door actuating device for an air conditioner of a vehicle can efficiently prevent separation of a link member after the link member is coupled to a rotating member when operating two doors simultaneously by using one door actuator, and the rotating member has a simple structure, thereby increasing facility of fabrication and reducing the fabricating cost.

7 Claims, 11 Drawing Sheets

[Fig.1]

Prior Art

[Fig.2]

Prior Art

[Fig. 3]

Prior Art

DOOR ACTUATING DEVICE FOR AIR CONDITIONER OF VEHICLE

TECHNICAL FIELD

The present invention relates to a door actuating device for an air conditioner of a vehicle, particularly, to a door actuating device for an air conditioner of a vehicle, in which one end of the link member which connects a second door is coupled through the first arm to a slot of a cam plate which is coupled to the first arm, when operating two doors simultaneously by using one door actuator.

BACKGROUND ART

Figure 1:
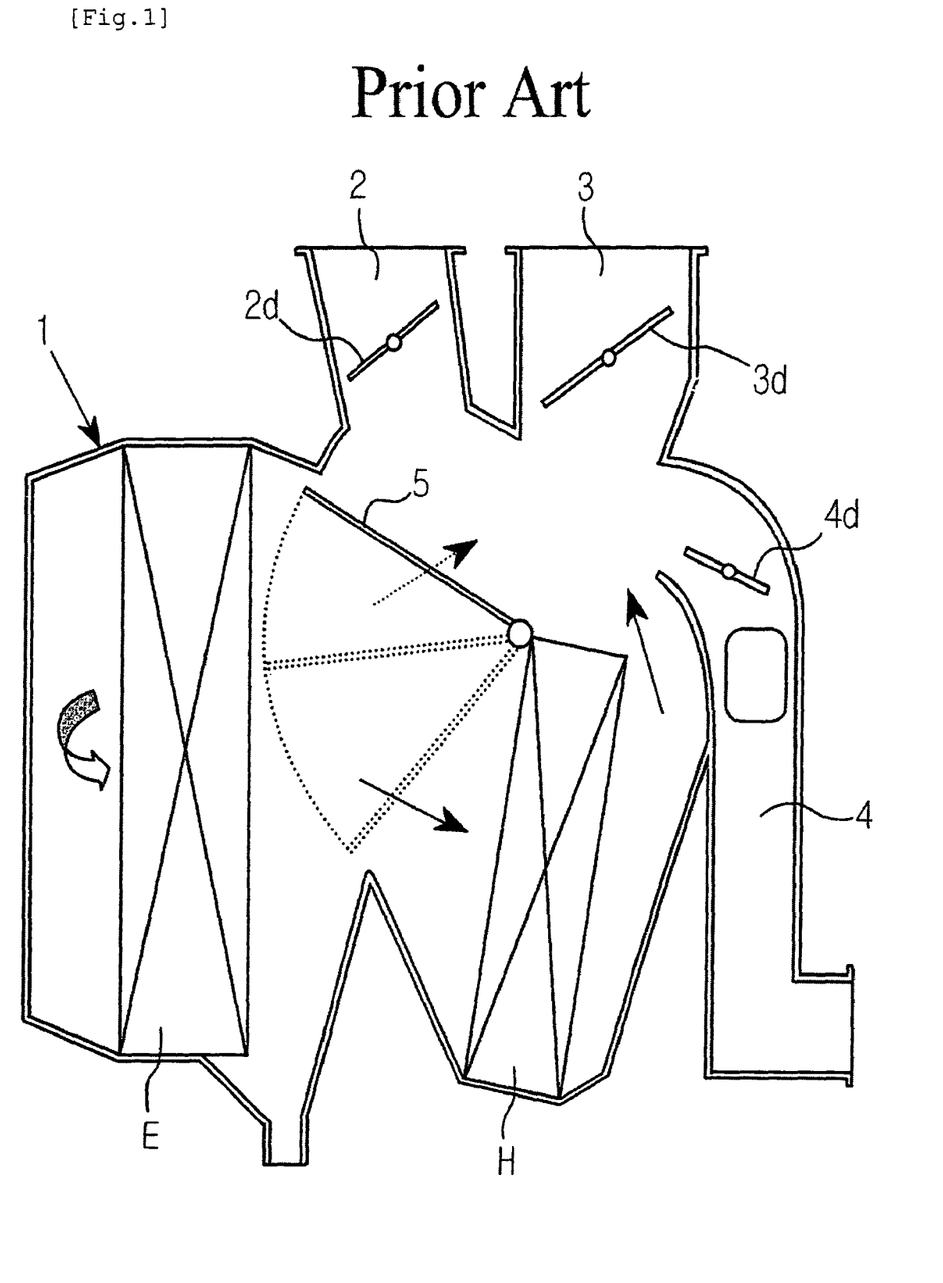
FIG. 1 is a cross-sectional showing an example of a conventional air conditioner of a vehicle.

As shown in FIG. 1, an air conditioner of a vehicle is provided with an air conditioning case 1 in which a blower (not shown) is provided at an entrance thereof, and an evaporator E and a heater core H which are provided in the case 1. The evaporator E is connected to an air cooling system, and the heater core H is connected to an air heating system. That is, when the air cooling system is operated, the air sent by the blower is cooled through the evaporator E and then discharged to the inertial of the vehicle, thereby performing an air cooling operation. Further, when the air heating system is operated, the air cooling system is stopped and the air sent by the blower is cooled through the heater core H and then discharged to the inertial of the vehicle, thereby performing an air heating operation.

And as shown in FIG. 1, in order to control air flow, temperature, a direction of the air flow and so force in the interior of the vehicle, there is provided a plurality of doors, for example, an air intake door (not shown) for selectively determining suction of indoor/outdoor air to the blower (not shown) and the air conditioning case 1, a temp door 5 for determining an air volume passing through the heater core H and an air volume bypassing the heater core H, and mode doors 2d, 3d and 4d for determining face, defrost, floor, mix modes and so on. The doors 2d, 3d and 4d controls an opening angle of a defrost vent 2, a face vent 3 and a floor vent, thereby switching the above modes.

The above mentioned doors may be controlled manually. That is, the doors can be operated by switching a corresponding switch which is connected to a cable, a lever mechanism and so on.

Figure 2:
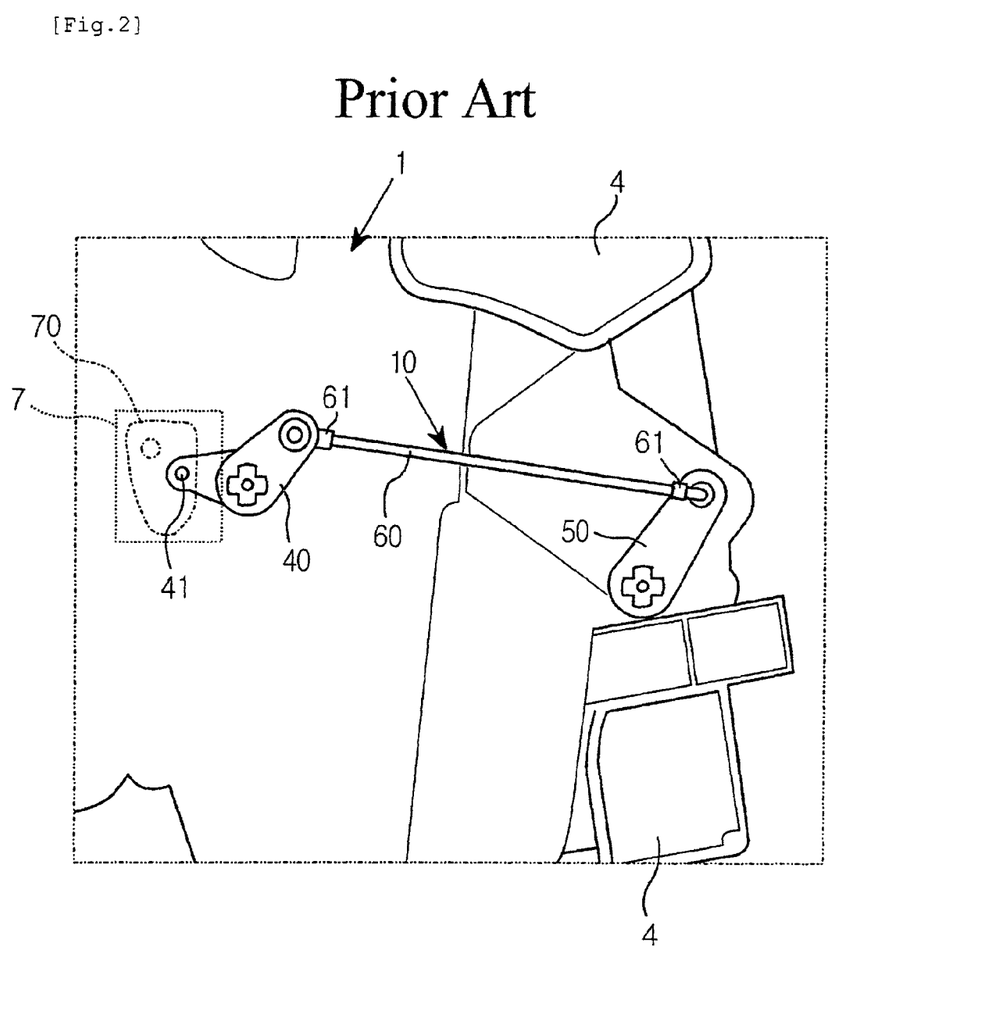
FIG. 2 is a side view showing a status that a door actuating device for the conventional air conditioner of the vehicle is provided at an outer surface of an air conditioning case.

Further, in case of a high-class vehicle, as shown in FIG. 2, a door actuator 7 which is driven by an output signal of a control unit is provided at an outer surface of the air conditioning case 1 so as to be directly connected to a rotational shaft of each of the doors or connected through the lever mechanism. Thus, the doors can be automatically controlled.

Figure 3:
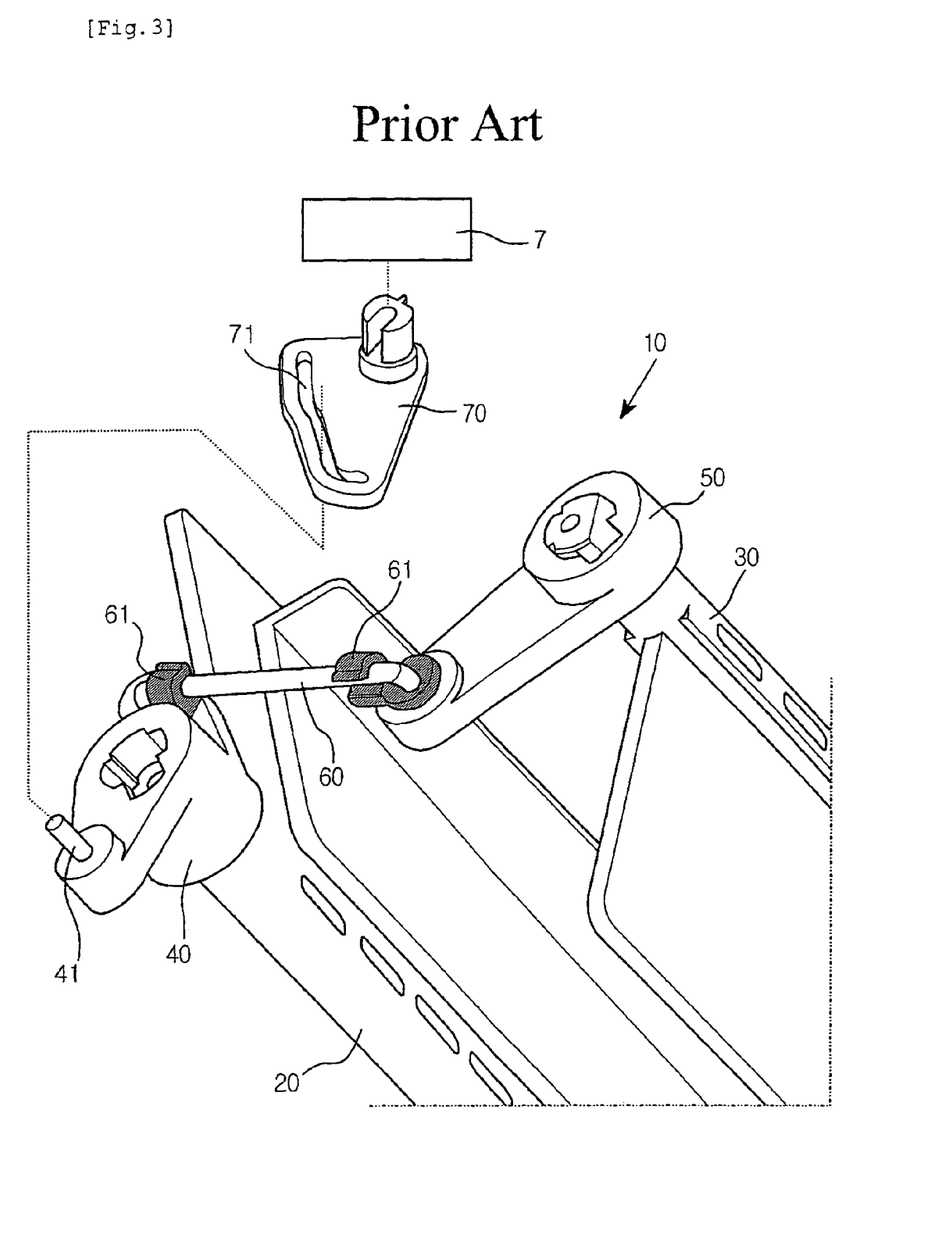
FIG. 3 is a perspective view showing an example of the door actuating device for the conventional air conditioner of the vehicle.

The door actuator 7 controls one or a plurality of doors through a door operating device 10. FIGS. 2 and 3 show an example of the door operating device 10 for controlling two doors. A first arm 40 and a second arm 50 as rotating members are connected with a link member 50. Of course, the rotating members are connected with the link member 60 may function as a lever for controlling an opening/closing angle of each door according to an operating status of the doors.

In Korean U.M. Laid-Open No. 1998-045709 and Japanese U.M. Laid-Open No. 1993-76818, there are disclosed connecting methods between the link member 60 and the arm. As shown in FIGS. 2 and 3, a conventional door operating device 10 includes a first arm 40 which is coupled with a door shaft 21 of a first door 20 and also formed with a pivot 41; a link member 60 of which one end is connected with one end of the first arm 40 and the other end is connected with a second arm 30; and a cam plate 70 having a slot 71 in which the pivot 41 is movably inserted. The can plate 70 is coupled with an output shaft of the door actuator 7. And a reference numeral 50 indicates the second arm which is coupled with a door shaft 31 of the second door 30 and also connected with the other end of the link member 60.

According to the conventional door operating device 10 as described above, the cam plate 70 is rotated by the door operating device 10, and the first door 40 is also rotated along with the first arm 40 by the pivot 41 according to the rotation of the cam plate 70. And the second door 30 is rotated by the link member 60 connected with the first arm 40 according to the rotation of the first arm 40.

Figure 4:
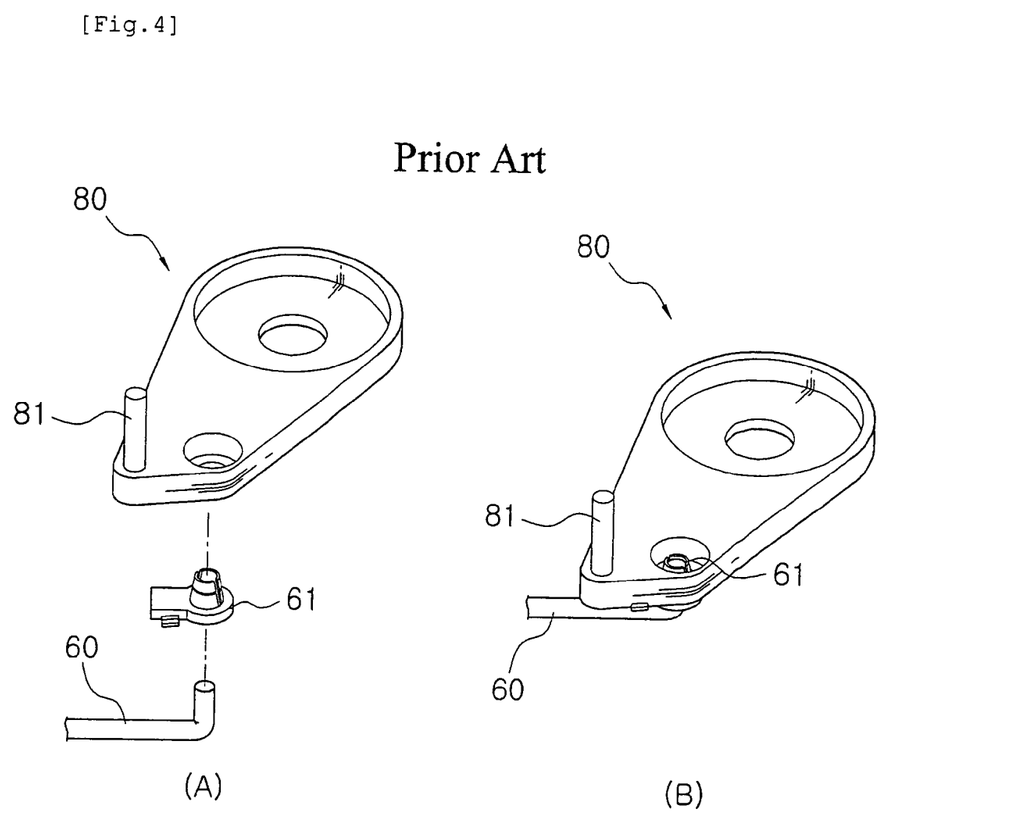
FIG. 4 is a view showing a status that a rotating member is coupled with a link member in the conventional air conditioner of the vehicle.

FIG. 4 shows a connecting status between the rotating member and the link member of the conventional door operating device. Herein, the rotating member will be described briefly.

FIGS. 2 and 3 show an example in which the first arm and the second arm are directly connected with the link member, wherein the arm is defined as a part which is directly connected with the door shaft so as to generate the rotating movement for opening and closing the door. A reference numeral 80 of FIG. 4 is a lever 80. If it is required that the arms are interlocked to be operated with a different angle, respectively, it may be designed to interlock the arms and the link member along with other parts therebetween. The lever is the part for connecting the arms and the link. In other words, the arm is the part which is directly connected to the door shaft, and the lever is the part which is interposed between the arm and the link member when the arms are not directly connected with the link member. Therefore, the link member 60 may be connected with the arm or the lever 80.

Herein, the part which is directly connected to the end of the link member 60 is commonly called the rotating member. That is, in FIGS. 2 and 3, the first arm and the second arm are the rotating members, and the lever 80 in FIG. 4 also functions as the rotating member. Of course, the shape of each of the first and second arms and the lever in FIGS. 2 to 4 is just an example, and it may be changed according to a design of the door operation. The lever 80 in FIG. 4 has a pivot 81 which is inserted into the slot 71 of the cam plate 70 of FIGS. 2 and 3.

In the conventional door operating device 10, since the rotating member (the first arm 40 of FIGS. 2 and 3, and the lever 80 of FIG. 4) is assembled to the cam plate 70 by using the pivot (the reference numeral 41 of FIGS. 2 and 3, and 81 of FIG. 4), the rotating member should has a separate hole for coupling the pivot and the link member 60. Therefore, there is a problem that the rotating member has a complicated structure.

In addition, when the link member 60 is coupled to the rotating member, since a link holder 61 is provided at both ends of the link member 60 so as to prevent the end of the link member 60 from being separated, a separate member is also added. Therefore, there is another problem that assembling processes and parts are increased and thus a fabricating coast is increased.

Further, if the link holder 61 is used as described above, since the link holder 61 is inserted into the rotating member together with the end of the link member 60, it is apprehended that a gap is formed by action of the link member 60, whereby the door is erroneously operated.

DISCLOSURE OF THE INVENTION

It is an object of the present invention to provide a door actuating device for an air conditioner of a vehicle, in which it is possible to efficiently prevent separation of a link member after the link member is coupled to a rotating member when operating two doors simultaneously by using one door actuator, and the rotating member has a simple structure, thereby increasing facility of fabrication and reducing the fabricating cost.

Hereinafter, the present invention is described in detail.

In order to achieve the object, there provides a door actuating device for an air conditioner of a vehicle having doors installed at an inside of an air conditioning case (C), in which a heater core (H) and an evaporator (E) are built, so as to open/close a flow path according to user choosing temperature and mode, at least two doors thereof being interlocked to be operated, wherein the device comprises rotating members connected to each door shaft (111, 121) of the doors (110, 120) and a link member (150) having one end (151) connected to one of the rotating member and the other end (152) connected to the other rotating member so that the rotating members are interlocked, wherein one end portion (151) of the link member (150), inserted in a link engaging hole (132) of at least one of the rotating member among the rotating members, is projected by a predetermined length to be inserted into a slot (161) of an interlocking member so as to operate the interlocking member together with the rotating member, the interlocking member being superposedly installed and interlocked with the rotating member.

Preferably, at least one of the rotating member is provided at a portion where the one end portion (151) of the link member (150) is connected to the rotating member with a link separation preventing member (131) which supports the link member (150) so that the one end portion (151) of the link member (150) is not separated from the rotating member.

Preferably, the link separation preventing member (131) is provided with a link supporting portion (131a) for supporting the link member (150), formed on a surface parallel to a side surface of the rotating member and curved parallel to an edge of the rotating member, a connecting portion (131c) for connecting a side of the link supporting portion (131a) and the rotating member, and a link assembling portion (131b) formed as the other side of the link supporting portion (131a) is opened so as to mount the link member (150).

Preferably, a projected length of the one end portion (151) of the link member (150) is between 0.5 to 1.5 times than the thickness of the slot (161) of the interlock member in which the one end portion (151) of the link member (150) is inserted, and the interlock member is a cam plate (160) actuated by a door actuator (170).

Preferably, the rotating member is arms (130, 140) which are directly connected to the door shafts (111, 121) or levers (142, 180) which are connected between the arms (130, 140) and the link member (150).

Preferably, the link supporting portion (131a) extends parallel to and along a trace of rotation of the link member (150) which is pivoted when the doors are operated, so that it supports the link member (150) and does not interfere with the link member (150).

Preferably, the link supporting portion (131a) is provided with an arc portion corresponding to a trace of rotation of the link member (150) which is pivoted when the doors are operated and a linear portion extending to be connected to the connecting portion (131c), so that it supports the link member (150) and does not interfere with the link member (150).

Preferably, the lever (180) is provided with a pivot (183) coupled to be interlocked with the rotating member at one side thereof and a link separation preventing member (181) at the other side thereof, and the one end portion (151) of the link member (150) is projected through the link engaging hole (182) at a side where the link separation preventing member (181) is formed and the interlock member is coupled to the projected one end portion (151) of the link member (150).

Preferably, the rotating member which is couples to the one side of the lever (180) is the arm (130) which is connected to the door shaft and the interlock member is a cam plate (160).

[Detailed description of main elements]

| | |
|---|---|
| 100: | door actuating device |
| 110: | first door |
| 111: | door shaft of first door |
| 120: | second door |
| 121: | door shaft of second door |
| 130: | first arm |
| 131: | link separation preventing member |
| 140: | second arm |
| 150: | link member |
| 151: | one of link member |
| 152: | the other end of link member |
| 160: | cam plate |
| 161: | slot |
| 170: | door actuator |
| 180: | lever |
| C: | air conditioning case |
| E: | evaporator |
| H: | heater core |

BEST MODE FOR CARRYING OUT THE INVENTION

Practical and presently preferred embodiments of the present invention are illustrative as shown in the following Examples and Comparative Examples.

However, it will be appreciated that those skilled in the art, on consideration of this disclosure, may make modifications and improvements within the spirit and scope of the present invention.

Figure 5:
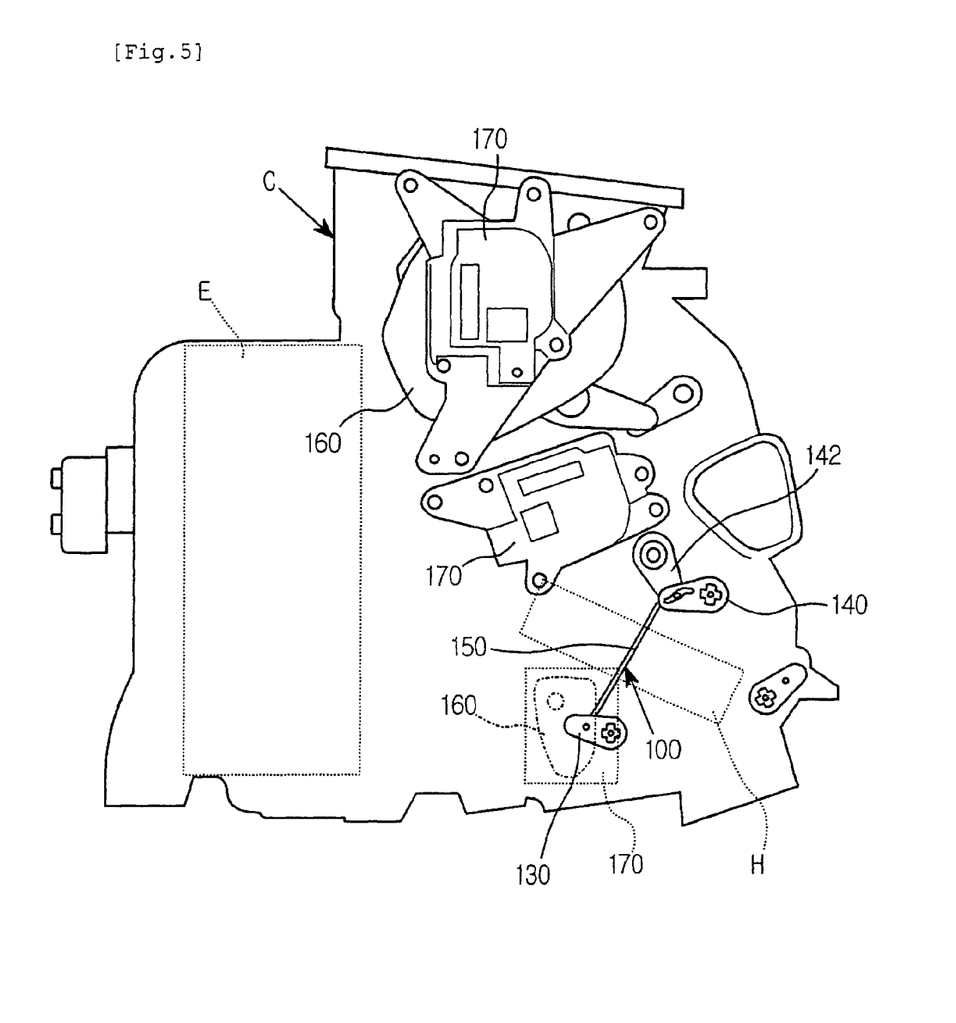
FIG. 5 is a side view showing a status that a door actuating device for an air conditioner of the vehicle is provided at an outer surface of an air conditioning case according to the present invention.

FIG. 5 shows an air conditioner having a door actuating device according to the present invention. The air conditioner having a door actuating device 100 of the present invention is provided with an air conditioning case C in which a heater core H and an evaporator E are disposed, and a plurality of doors are also provided. The doors are disposed to open/close an air flow path according to a temperature and a mode selected by a user, and the doors are operated by a door actuator 170. Two or more doors out of them are connected by a link member mechanism including a cam plate 160, which is connected with the door actuator 170, so as to be interlocked with each other.

Figure 6:
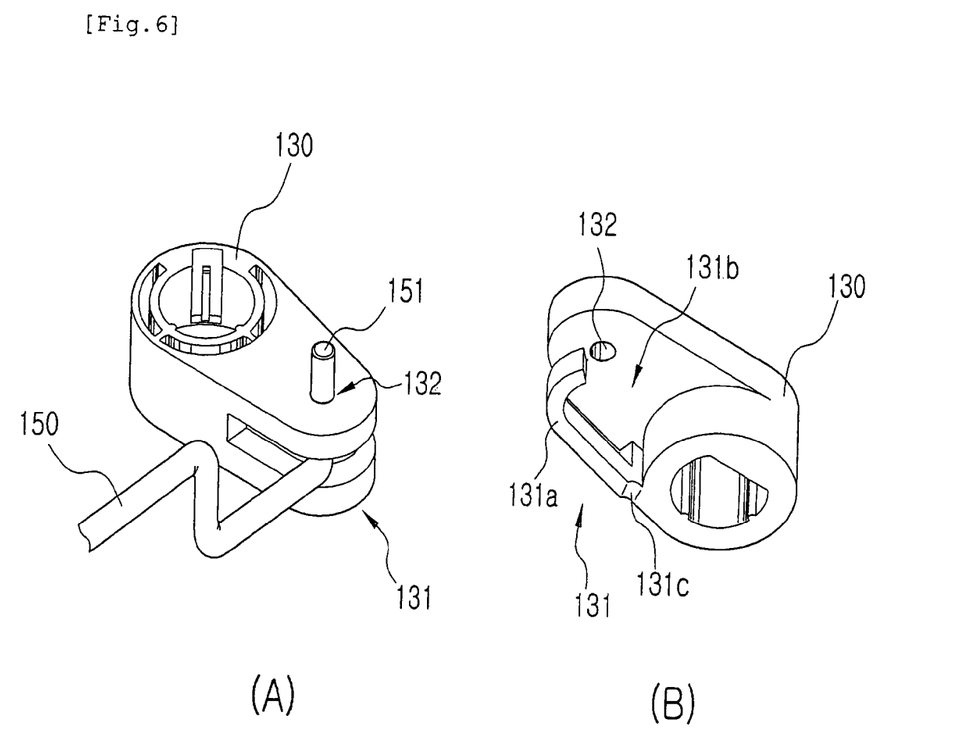
FIG. 6 is a perspective view showing a status that a rotating member is coupled with a link member in the air conditioner of the vehicle according to the present invention.
Figure 8:
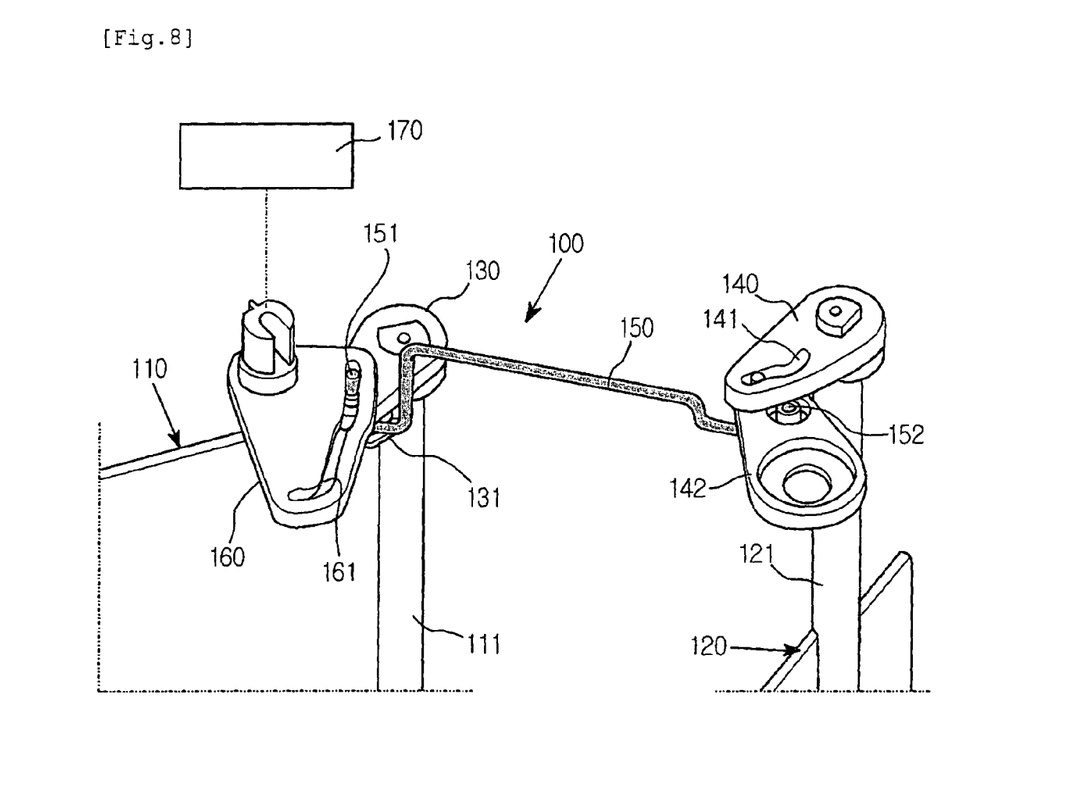
FIG. 8 is a perspective view showing one embodiment of a door actuating device for the air conditioner of the vehicle according to the present invention.

FIG. 6 shows a status that a rotating member is coupled with a link member in the air conditioner of the vehicle according to the present invention, and FIG. 8 shows one embodiment of the door actuating device for the air conditioner of the vehicle according to the present invention.

In the embodiment of FIG. 6, the rotating member which is directly connected with one end 151 of a link member 150 is a first arm 130 shown in FIG. 8. However, other arm or a lever may be used as the rotating member which is directly connected with the end of the link member 150. FIG. 6 is just an example for describe a coupling structure between the rotating member and the link member, and the present invention is not limited by the embodiment shown in FIG. 6.

As shown in FIG. 6A, in order to prevent the end 151 of the link member 150 from being separated from a first arm 130, a link separation preventing member 131 is integrally formed with the first arm 130 or provided as a separate member at a connecting portion that the end 151 of the link member 150 is connected with the first arm 130. The link separation preventing member 131 is bent parallel with an edge of the first arm 130 over a relative motion distance so as to support the end 151 of the link member 150.

FIG. 6B shows a detailed description of the link separation preventing member 131. The link separation preventing member 131 includes a link supporting portion 131a which is formed on a surface parallel with a side surface of the first arm 130 and bent parallel with the edge of the first arm 130 so as to support the end 151 of the link member 150, a connecting part 131c which connects one side of the link supporting portion 131a with the rotating member, and a link assembling portion 131b which is formed by opening the other side of the link supporting portion 131a so as to dispose the link member 150. As shown in FIG. 6B, the link supporting portion 131a is formed to be parallely extended along a rotational track of the link member 150 rotated when operating the doors 110 and 120, or formed so that a circular portion for the rotational track and a straight portion are coupled, thereby supporting the link member 150 and also preventing interference by the link member 150.

Figure 11:
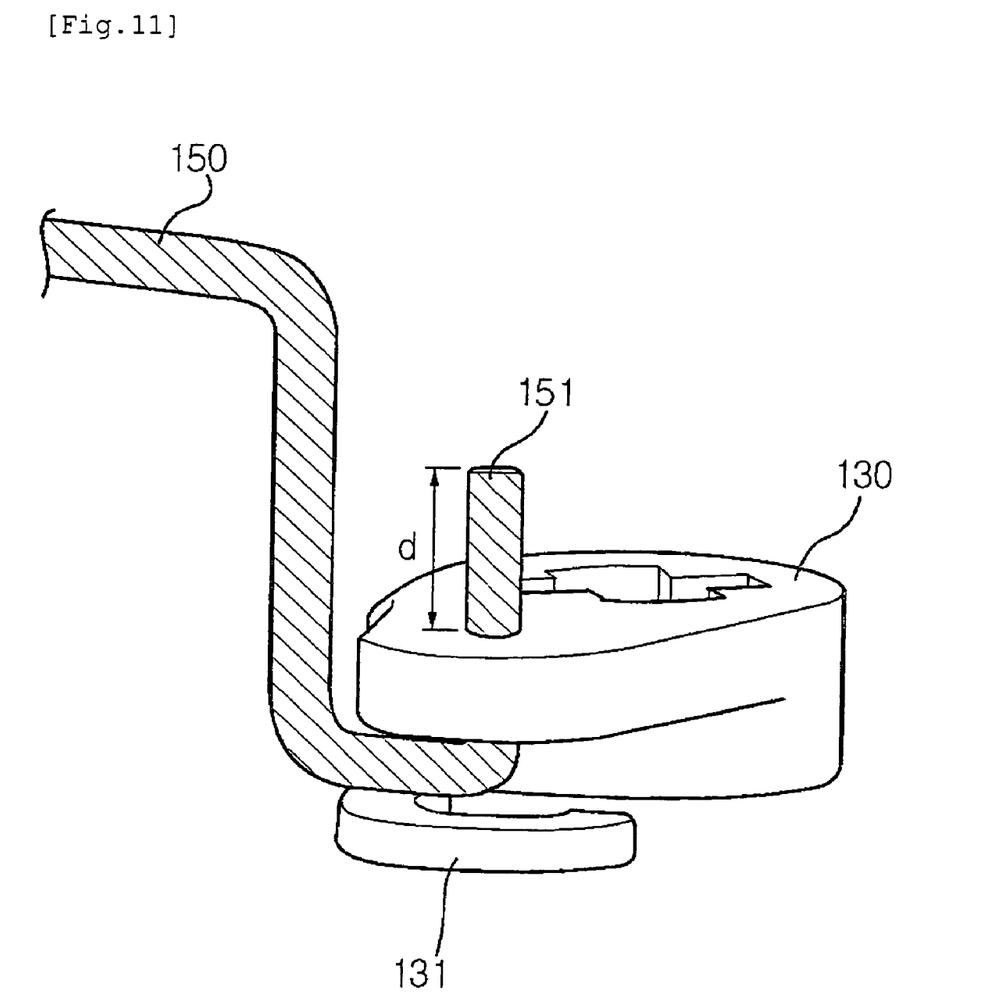
FIG. 11 is a perspective view showing a main portion of the door actuating device for the air conditioner of the vehicle according to the present invention.

Particularly, in FIG. 6, the end 151 of the link member 150 may be designed to be protruded from a surface of the first arm 130 in a desired length. As showing in FIG. 11, the end 151 of the link member 150, which is protruded in a desired length d, may function as a pivot corresponding to a reference numeral 41 in FIGS. 2 and 3, and 81 in FIG. 4. Therefore, by controlling the protruded length of the end 151 of the link member 150, it is possible to interlock the cam plate and the first arm 130 without a separate pivot.

Figure 9:
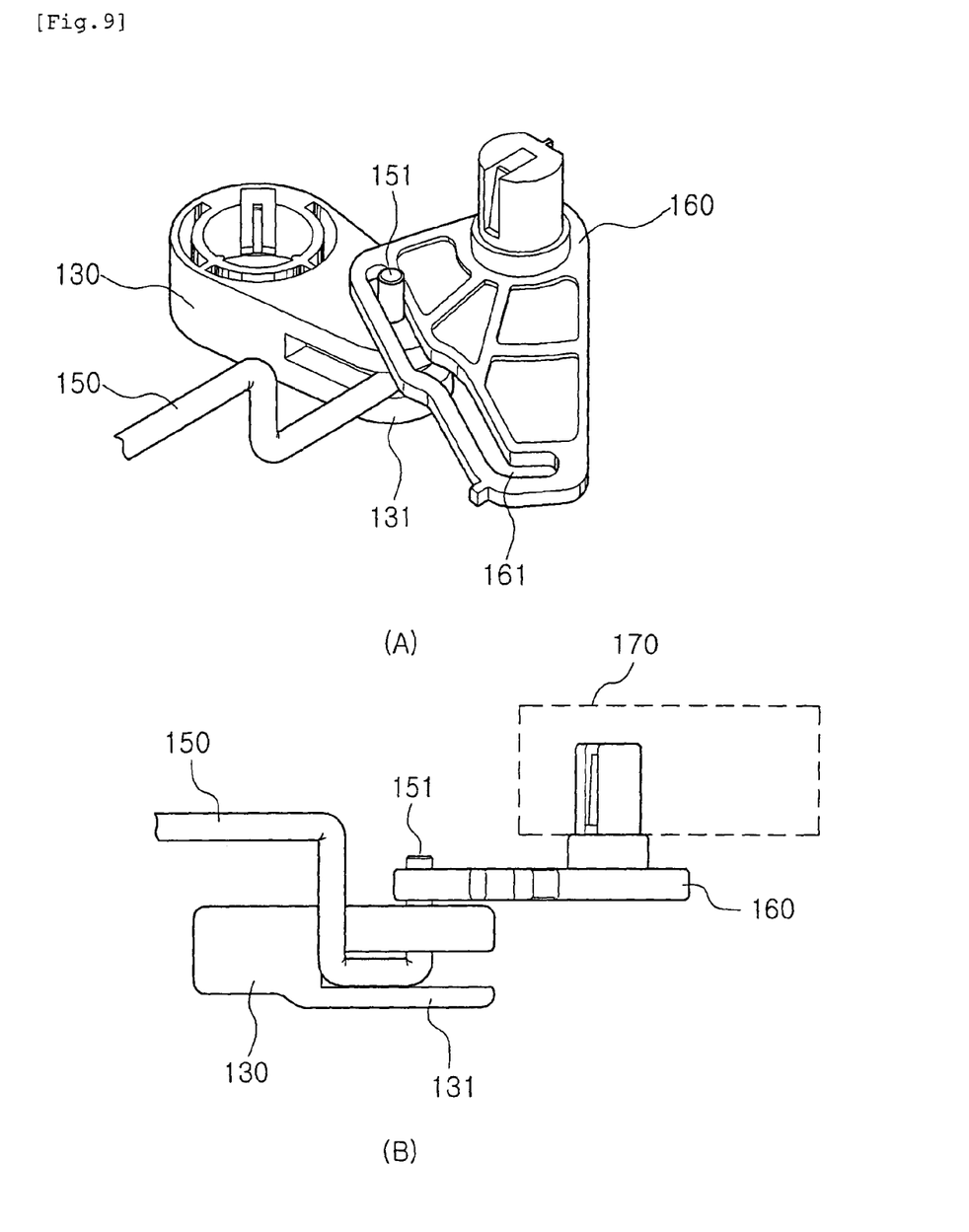
FIG. 9 is a partial side view of FIG. 8.

FIG. 9 is one embodiment of the door actuating device for the air conditioner of the vehicle, wherein the link separation preventing member 131 of the present invention is applied to the first arm 130, and the end 151 of the link member 150 is protruded to function as the pivot and coupled with the cam plate 160 (in this case, the first arm 130 is a rotating member, and the cam plate 160 is an interlocking member). Referring to FIG. 9, the extruded length of the end 151 of the link member 150 is 0.5 times greater than or 1.5 times less than a thickness of a slot 161 of the cam plate 160. At this time, in order to stably transmit a force when operating the cam plate 160 with the end 151 of the protruded link member 150, it is preferred that the extruded length is formed to be greater than or equal to the thickness of the slot 161 of the cam plate 160.

Figure 7:
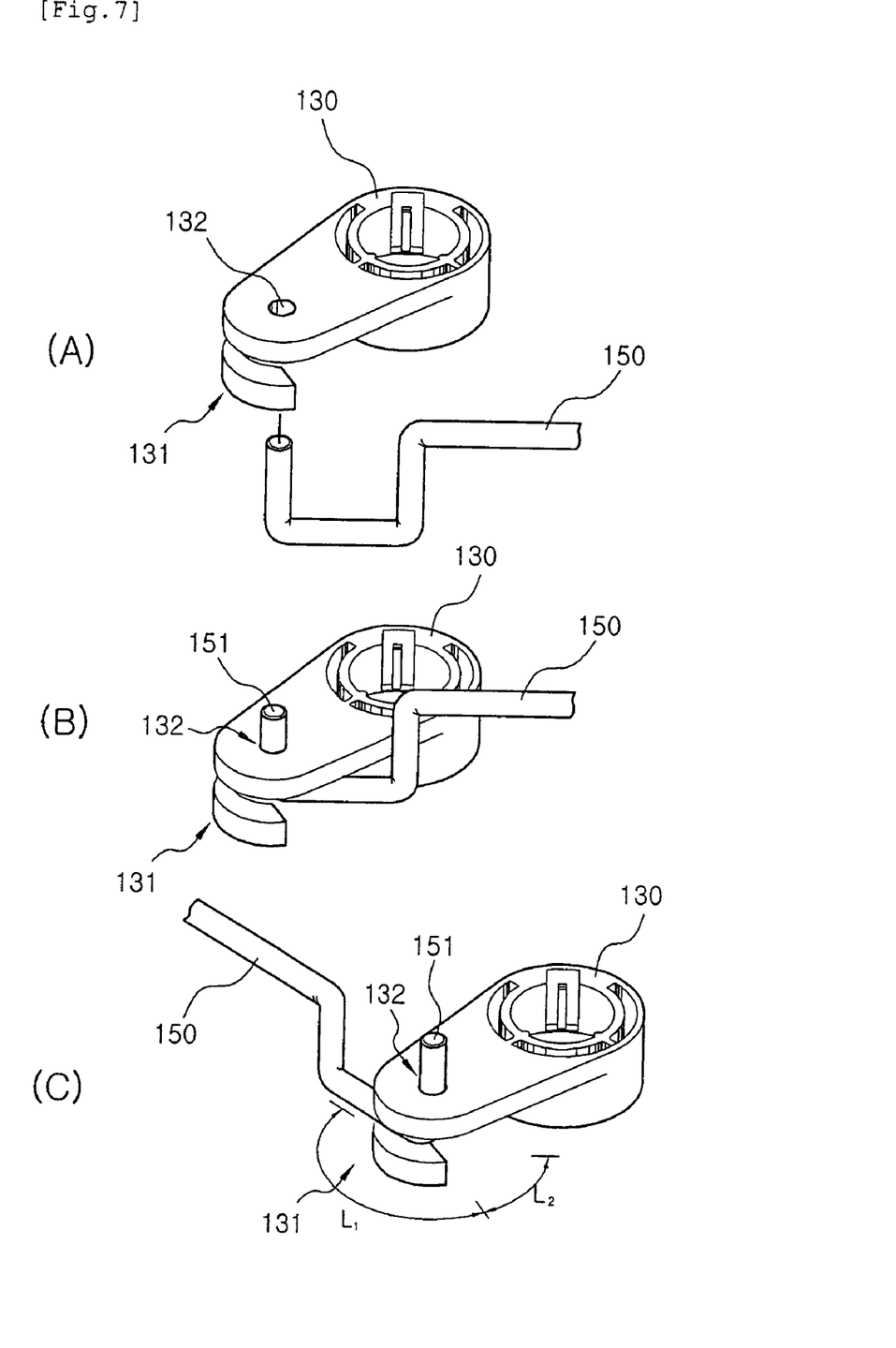
FIG. 7 is a view showing an assembly process of the rotating member and the link member of the air conditioner of the vehicle according to the present invention.

FIG. 7 shows an assembly process of the link member 150 and the first arm 130. As shown in FIG. 7A, the end 151 of the link member 150 is passed through the link assembling portion 131b and then inserted into a coupling hole 132 of the first arm 130. If the end 151 of the link member 150 is completely inserted to a bent portion of the end 151, as shown in FIG. 7B, the link member 150 is rotated so as to be interposed between the link supporting portion 131a and the first arm 130. A moving range of the link member 150 after the link member 150 is mounted to the air conditioning case C is within L1 of FIG. 7C, and the link assembling portion 131b is designed to be formed over a range L2 beyond the range L1. Since the link 150 is moved only within the range L1 except an early stage of assembling process, although the link assembling portion 131b is opened, it is prevented that the link member 150 is separated from the first arm 130, and also the link member 150 is held within the range L1 by the link supporting portion 131a.

The door actuating device 100 of the present invention shown in FIG. 8 includes the first arm 130, the second arm 140 and the link member 150 so that at least two doors 110 and 120 can be interlocked with each other.

The first arm 130 is coupled to a distal end of a door shaft 111 of the first door 110. Therefore, when the first arm 130 is rotated, the first door 110 is also rotated.

The link member 150 is to connect the first door 110 and the second door 120. The end 151 of the link member 150 is passed through the first arm 130 and extruded to one side of the first arm (an upper side in Figure). The extruded end of the link member 150 is inserted into the slot 161 of the cam plate 160 which is driven by the door actuator 170. That is, the link member 150 is connected through the first arm 130 to the first door 110, and the extruded end 151 functions as the pivot.

Thus, if the cam plate 160 is rotated by the door actuator 170, the end 151 of the link member 150 is moved along the slot 161 of the cam plate 160 and thus the first door 110 can be rotated together with the first arm 130.

The second arm 140 is coupled to a distal end of a door shaft 121 of the second door 120 and formed with a slot 141. The other end 152 of the link member 150 is inserted into the slot 141, and thus the first and second doors 110 and 120 can be interlocked with each other by the link member 150, the first arm 130 and the second arm 140. Therefore, the first arm 130 is rotated along with the rotation of the cam plate 160, and the link member 150 is moved at the same time when the first door 110 is rotated, and the second arm 140 is rotated together with the movement of the link member 150, and thus the second door 120 can be rotated.

In order to prevent each end of the link member 150 from being separated from its inserted position, it is preferable that the link separation preventing member 131 is integrally formed with the first arm 130 at least one of the first and second arms 130 and 140 (for example, 130), so that the end of the link member 150 is not separated from the arm 130. The link separation preventing member 131 is bent parallel with an edge of the first arm 130 over a relative motion distance of the link member 150 and the arm 130 so as to support the end 151 of the link member 150.

This structure of the link separation preventing member 131 as it is can be applied to the second arm 140 which is connected with the end of the link member 150, and also can be applied to the both arms 130 and 140 at the same time. A reference numeral 142 is a lever which is connected to the second arm 140 or formed integrally with the second arm 140 so as to connect the other. Of course, the structure of the link separation preventing member 131 as it is can be applied to the lever 142. That is, as described above, when the parts such as the arm or the lever which are directly connected to the link member are commonly called as the rotating member, the link separation preventing member 131 can be applied to any rotating member.

Figure 10:
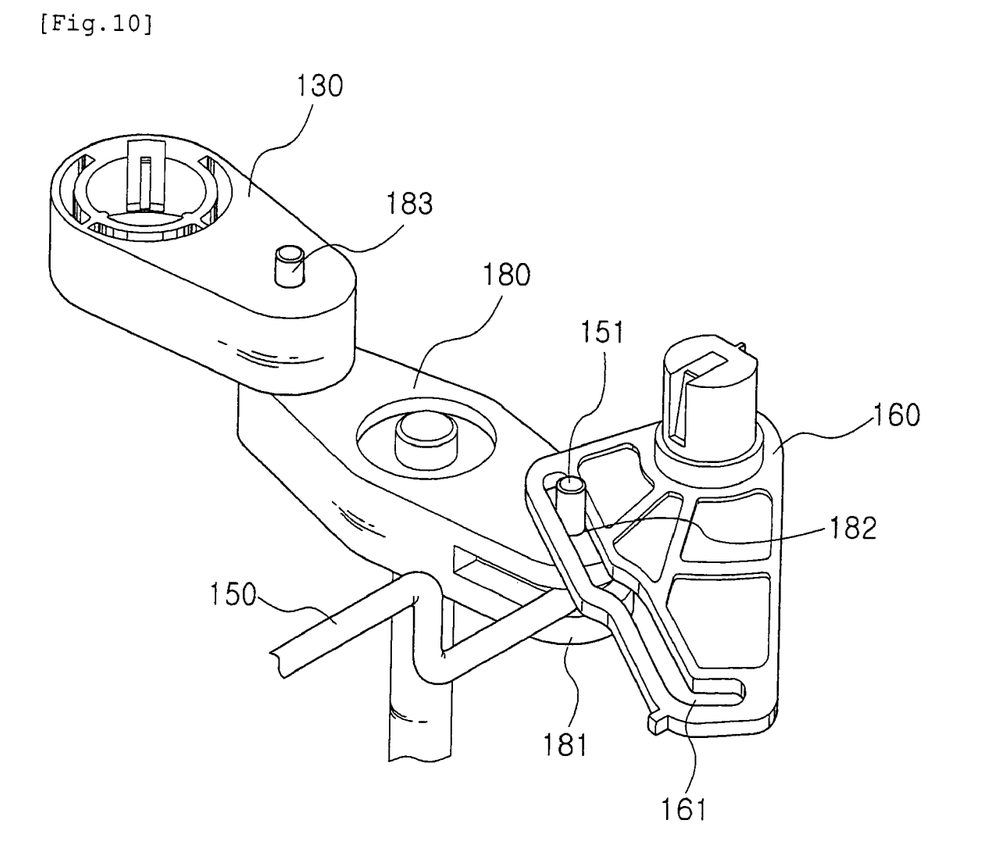
FIG. 10 is a perspective view showing other embodiment of the door actuating device for the air conditioner of the vehicle according to the present invention.

FIG. 10 shows other embodiment in which a link separation preventing member 181 is applied to a lever 180. In FIG. 10, the lever 180 connects the first arm 130 and the cam plate 160. A pivot 183 is provided at one side of the lever 180 to be coupled with the first arm 130, and the link separation preventing member 181 is applied to the other side of the lever 180. As shown in FIG. 10, the link member 150 is coupled to a portion in which the link separation preventing member 181 is applied, the extruded end 151 of the link member 150 is coupled to the cam plate 160.

Hereinafter, an operation of the door actuating device for the air conditioner of the vehicle according to the present invention will be described.

If the door actuator 170 is operated to switch an air conditioning mode, the cam plate 160 is rotated, and the end 151 of the link member 150 which is inserted into the slot 161 of the can plate 160 is moved according to the rotation of the cam plate 160, and thus the first arm 130 coupled with the link member 150 is rotated along with the first door 110. At the same time, the second door 120 which is connected with the other end 152 of the link 150 is also rotated according to the movement of the link member 150.

Therefore, the air flow path is changed by the first and second doors 110 and 120, thereby switching the air conditioning mode.

As described above, since the inserted end of the link member 150 is grasped by the link separation preventing member 131 upon the operation of the door actuating device 100, it is prevented that the inserted end of the link member 150 is separated, thereby stably operating the doors 110 and 120 without any error.

According to the door actuating device for an air conditioner of a vehicle according to the present invention constructed as described above, the one end portion 151 of the link member 150 is coupled to the slot 161 of the cam plate 160 through the first arm 130 so as to additionally have a pivot function, therefore it is not necessary to form separately a pivot for coupling the cam plate 160 to the first arm 130 as the prior art and thus capable of simplifying the structure of the first arm 130.

Further, the grasping clip 131 for preventing the end portion of the link member 150 from being separated is formed integrately to a member in which the end portion of the link member 150 is inserted, i.e. the first arm 130 and the second arm 140, therefore a number of parts is reduced and it is capable of promoting an increase of productivity and reduction of the manufacturing cost as there is no need to applicate a separate part such as a link member holder which is separately employed to prevent the end portion of the link member 150 from being separated.

Furthermore, the end portion of the link member 150 is directly connected to the first arm 130 and the second arm 140 with no interposition of a part such as a link member holder which is employed in prior art, therefore a gap of a portion in which the link member 150 is inserted can be reduced, thereby actuating correctly the doors 110 and 120.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A door actuating device for an air conditioner of a vehicle having doors installed at an inside of an air conditioning case, a heater core and an evaporator built in the air conditioning case, so as to open/close a flow path according to user-chosen temperature and mode, at least two doors of the doors inside the air conditioning case being interlocked to be operated, the devices comprising:
a plurality of rotating members connected to each door shaft of the doors;
a link member having one end portion connected to one of the rotating members and another end portion connected to another rotating member such that the rotating members are interlocked, wherein at least one of the rotating members defines a link engaging hole;
an interlocking member defining a slot and superposedly installed and interlocked with the at least one rotating member defining the link engaging hole; and
a link separation preventing member integrated with the at least one rotating member defining the link engaging hole;
wherein one of the link member end portions is inserted in the link en hole of the at least one of the rotating members, the inserted one end portion of the link member protruding a predetermined length from the link engaging hole and being inserted into the slot of the interlocking member, so as to operate the interlocking member together with the rotating member, and
wherein the link separation preventing member supports the link member so that the inserted one end portion of the link member is not separated from the rotating member.

2. The door actuating device for an air conditioner of a vehicle according to claim 1, wherein the link separation preventing member comprises a link supporting portion, for supporting the link member, formed on a surface parallel to a side surface of the rotating member and curved parallel to an edge of the rotating member, a connecting portion for connecting a side of the link supporting portion and the rotating member, and a link assembling portion formed as the other side of the link supporting portion is opened so as to mount the link member.

3. The door actuating device for an air conditioner of a vehicle according to claim 2, wherein a projected length of the inserted one end portion of the link member is between 0.5 to 1.5 times than the thickness of the slot of the interlock member in which the inserted one end portion of the link member is inserted.

4. The door actuating device for an air conditioner of a vehicle according to claim 2, wherein the interlock member is a cam plate actuated by a door actuator.

5. The door actuating device for an air conditioner of a vehicle according to claim 2, wherein the rotating member is arms which are directly connected to the door shafts.

6. The door actuating device for an air conditioner of a vehicle according to claim 2, wherein the link supporting portion extends parallel to and along a trajectory of rotation of the link member which is pivoted when the doors are operated, so that the link supporting portion supports the link member and does not interfere with the link member.

7. The door actuating device for an air conditioner of a vehicle according to claim 2, wherein the link supporting portion comprises an arc portion corresponding to a trajectory of rotation of the link member which is pivoted when the doors are operated and a linear portion extending to be connected to the connecting portion, so that the link supporting portion supports the link member and does not interfere with the link member.

* * * * *

UNITED STATES PATENT AND TRADEMARK OFFICE
CERTIFICATE OF CORRECTION

PATENT NO. : 8,025,096 B2  
APPLICATION NO. : 11/703273  
DATED : September 27, 2011  
INVENTOR(S) : Sung Ho Kang Page 1 of 1

It is certified that error appears in the above-identified patent and that said Letters Patent is hereby corrected as shown below:

Column 8, Claim 1, Line 24, delete "devices" and insert -- device --

Column 8, Claim 1, Line 39, delete "en" and insert -- engaging --

Signed and Sealed this  
Tenth Day of January, 2012

David J. Kappos  
*Director of the United States Patent and Trademark Office*